United States Patent
Ramiah et al.

(10) Patent No.: US 12,547,731 B2
(45) Date of Patent: Feb. 10, 2026

(54) RISK MITIGATION TECHNIQUES BASED ON SOFTWARE BILL OF MATERIALS

(71) Applicant: Cisco Technology, Inc., San Jose, CA (US)

(72) Inventors: Chockalingam Ramiah, Cary, NC (US); John William Garrett, Apex, NC (US); Arvind Vasudev Chari, New York, NY (US)

( * ) Notice: Subject to any disclaimer, the term of this patent is extended or adjusted under 35 U.S.C. 154(b) by 87 days.

(21) Appl. No.: 18/419,812

(22) Filed: Jan. 23, 2024

(65) Prior Publication Data

US 2025/0238520 A1 Jul. 24, 2025

(51) Int. Cl.
G06F 21/57 (2013.01)
G06F 8/65 (2018.01)
G06Q 10/0875 (2023.01)

(52) U.S. Cl.
CPC .............. *G06F 21/577* (2013.01); *G06F 8/65* (2013.01); *G06Q 10/0875* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 9,952,961 | B2 * | 4/2018 | Atyam | G06F 8/70 |
| 10,484,429 | B1 * | 11/2019 | Fawcett | H04L 63/20 |
| 12,008,357 | B2 * | 6/2024 | Masis | G06F 8/658 |
| 12,393,700 | B1 * | 8/2025 | Apostolopoulos | G06F 21/577 |
| 2018/0150639 | A1 * | 5/2018 | Abramovsky | G06F 21/577 |
| 2021/0075814 | A1 | 3/2021 | Bulut | |
| 2021/0157905 | A1 * | 5/2021 | Musseau | G06F 9/442 |
| 2021/0232995 | A1 | 7/2021 | Zhang | |
| 2021/0273968 | A1 * | 9/2021 | Shaieb | G06F 8/65 |
| 2022/0129561 | A1 * | 4/2022 | Shivanna | G06F 16/951 |
| 2023/0208869 | A1 | 6/2023 | Bisht | |
| 2023/0269272 | A1 | 8/2023 | Dambrot | |
| 2023/0315491 | A1 * | 10/2023 | Brdiczka | G06F 9/451 |

(Continued)

OTHER PUBLICATIONS

Daigle, et al., "Reference Architecture for Generative AI Based on Large Language Models (LLMs)", Lenovo Press, Dec. 15, 2023, Form No. LP1798, 57 Pages. Retrieved from: https://lenovopress.lenovo.com/lp1798-reference-architecture-for-generative-ai-based-on-large-language-models.

*Primary Examiner* — Younes Naji
(74) *Attorney, Agent, or Firm* — Lee & Hayes, P.C.

(57) ABSTRACT

Techniques are described herein for reducing a risk exposure related to a software application. The techniques may comprise receiving an indication of a software application, identifying a number of components associated with that software application as well as a number of vulnerability scores corresponding to the number of components, determining, based on the number of vulnerability scores, a risk score associated with the software application, and identifying one or more updates associated with the number of components and determining a change to the risk score associated with those one or more updates. In embodiments, the techniques may further comprise receiving an indication of a threshold risk score and determining at least one of the one or more updates that, when applied to at least one of the number of components, is determined to lower the risk score to below the threshold risk score.

16 Claims, 9 Drawing Sheets

(56) References Cited

U.S. PATENT DOCUMENTS

2024/0195830 A1* 6/2024 Jayaraman .......... H04L 63/1433
2025/0147864 A1* 5/2025 Bastien ............... G06F 11/3612
2025/0173441 A1* 5/2025 McNally ............... G06F 21/577

* cited by examiner

RISK MITIGATION TECHNIQUES BASED ON SOFTWARE BILL OF MATERIALS

TECHNICAL FIELD

The present disclosure relates generally to software risk reduction, and more particularly to reducing a risk that a software application will expose an organization to. More particularly, the disclosure relates to techniques for determining and mitigating a level of risk to an organization using a software application based on information about components of that software application.

BACKGROUND

Modern software applications are built using a collection of pre-existing libraries, open-source code, and other reusable components, along with custom software code. However, these reusable components, which are often easily accessible by the public, can become susceptible to security threats. For example, malicious actors may review the code for the publicly available components and identify weaknesses of those components that can be exploited in malicious code.

In recent years, businesses have been increasingly adopting cloud-native architectures, as such architectures enable rapid application development with flexibility, stability, portability, and scalability. However, such architectures also massively increase the attack surface and can expose applications to new vulnerabilities and threats. At the same time, changes in the computing landscape have increased the risk of catastrophic security breaches.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
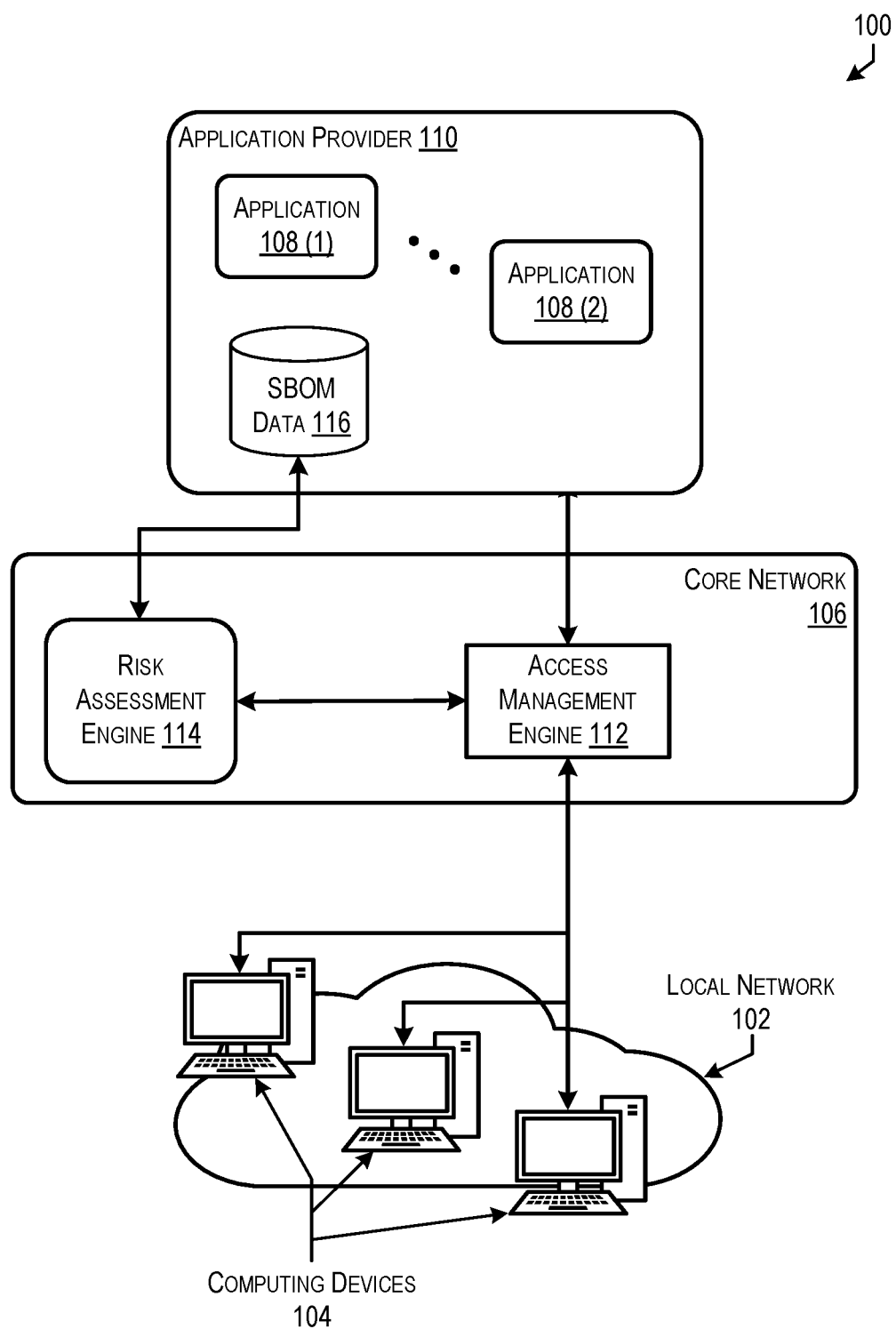
FIG. 1 depicts an example environment in which risks may be assessed in relation to detected vulnerabilities in accordance with at least some embodiments.

A first method according to the techniques described herein may include upon receiving an indication of a software application, identifying a number of components associated with that software application as well as a number of vulnerability scores corresponding to the number of components. The first method may further include determining, based on the number of vulnerability scores, a risk score associated with the software application. Additionally, the first method includes identifying one or more updates associated with the number of components and determining a change to the risk score associated with those one or more updates. In some cases, the first method may further include receiving an indication of a threshold risk score and determining at least one of the one or more updates that, when applied to at least one of the number of components, is determined to lower the risk score to less than the threshold risk score. In some cases, the first method may further include causing at least one update of the one or more updates to be implemented.

A second method according to the techniques described herein may include receiving an indication of a risk score threshold and an indication of a software application, identifying a number of components associated with the software application and a number of vulnerability scores corresponding to the number of components, and determining, based on the number of vulnerability scores, a risk score associated with the software application. Upon determining that the risk score associated with the software application is above the risk score threshold the second method may further include identifying a set of updates associated with the number of components, and determining, based on a change to the risk score attributed to each of the one or more updates, a subset of the set updates to be implemented to reduce the risk score to below the risk score threshold.

Additionally, the techniques described herein may be performed by a system and/or computing device having non-transitory computer-readable media storing computer-executable instructions that, when executed by one or more processors, performs the method described above.

Example Embodiments

In order to combat the threat posed by software vulnerabilities, the recently signed US Executive Order on Cybersecurity drives a public Software Bill of Materials (SBOM) to secure the software supply chain. An SBOM, or SBOM data, may include any suitable indication of a set of components associated with a software application. SBOM provides a standards-based framework to expose the underlying software ingredients that have been used in a software application, or a microservice that is used as part of a software application.

This disclosure describes techniques that may be performed by a service provider platform to provide risk mitigation within a cloud computing environment. In a cloud computing management, clusters of computing devices (either physical computing devices or virtual computing devices) are used to implement a number of services that may be accessed remotely by users.

Embodiments of the disclosure provide for a number of advantages over conventional systems. For example, the system allows organizations to understand a current level of risk that they are exposed to for any given software application using a consistent rating tool. By calculating a risk score for a software application using vulnerability information that is exposed in relation to components that make up the software application, the resulting risk score is calculated consistently and objectively. Organizations are also able to set an acceptable level of risk that their members are able to take on and the system can quickly identify the most efficient way to make an identified software application fit within that acceptable level of risk. To do this, the system is able to identify updates available to the software application as well as an impact that each of those updates will have on the overall risk associated with the software application.

FIG. 1 depicts an example environment in which risks may be assessed in relation to detected vulnerabilities in accordance with at least some embodiments. In the environment 100 of FIG. 1, a local area network (LAN) 102 may be accessed by a number of computing devices 104 at a geographic site. As depicted, the computing devices 104 may be in communication with core network 106 over which can be accessed one or more applications 108 (1-N) hosted by an application provider 110.

The computing devices 104 may be any suitable electronic devices used to access software applications 108 (e.g., software applications hosted by the application provider 110). By way of non-limiting example, such computing devices 104 may include a conventional server computer, workstation, desktop computer, laptop, tablet, network appliance, e-reader, smartphone, or other computing device.

The core network 106 may include any suitable combination of electronic devices that interact to form a network. In some embodiments, the core network 106 may include at least an access management engine 112 that manages access to the one or more applications 108 as hosted on a remote application provider 110. An access management engine 112 may be implemented on any computing device that monitors or manages access between the computing devices 104 and the application provider 110. In some cases, the access management engine 112 is implemented on an edge device acting as a network gateway between two or more networks (e.g., a LAN and a SD-WAN fabric). An edge device may include any electronic device that provides an ingress/egress point for a network (e.g., LAN 102). An example of an edge device may include a router, routing switch, integrated access device, multiplexer, or any other suitable device.

In embodiments, a core network 106 may be a Software-defined wide area network (SD-WAN). In such embodiments, the access management engine 112 may be implemented on a next generation firewall (NGFW), a secure web gateway (SWB), a web application firewall (WAF), a cloud access security broker (CASB), a security services edge (SSE), a software-defined networking (SDN) controller, or any other suitable electronic device. In general, an SDN controller may comprise one or more devices configured to provide a supervisory service, typically hosted in the cloud, to an SD-WAN fabric and/or one or more SD-WAN service points. For instance, an SDN controller may be responsible for monitoring the operations thereof, promulgating policies (e.g., security policies, etc.), installing or adjusting IPsec routes/tunnels between LAN 102 and remote destinations such as the application provider 110.

An access management engine 112 may be configured to manage access by one or more computing devices 104 to one or more application 108. When a user of one of the computing devices 104 accesses an application 108 hosted on the application provider 110 over the core network 106, the access management engine 112 may examine both the source and the destination of the flow, with the source internet protocol (IP) address used to determine the identity of the computing device or user generating the flow. The access management engine 112 examines the destination address of the flow and determines which application 108 the user is attempting to access. In some embodiments, other techniques may be used to determine the requested application, such as packet inspection in either the HTTP packet or the TLS SNI packet originating from the computing device 104. In some embodiments, the access management engine 112 may be configured to deny access to an application 108 if a risk score associated with that application is above a threshold acceptable risk score level (e.g., as dictated by a policy document).

In some embodiments, the environment 100 may include a risk assessment engine 114 that is configured to determine a risk score to be associated with one or more of the applications 108 (e.g., an application 108 to be accessed by a computing device 104). In some cases, such a risk score may be calculated based on a vulnerability associated with each of the components involved in the application.

In embodiments, calculating a risk score for an application may involve retrieving information about components included in, or used by, the software application. Such information may be retrieved from Software Bill of Materials (SBOM) data 116 as maintained by the application provider 110. The SBOM data is a nested inventory for a software application and may be generated in Software Product Data Exchange (SPDX) file format and stored in JavaScript Object Notation (JSON) file format. The SBOM data 116 for an application may be generated by a developer of that application 108 and may include a Common Vulnerability Exposure (CVE) score for the application itself as well as CVE scores/identification information for each of the components associated with the application. Each of the CVE scores may be calculated in accordance with the Common Vulnerability Scoring System (CVSS). In addition to CVE scores, the SBOM data 116 may include additional information about the application and/or components associated with the application, such as version strings, licenses, library names, author names, and/or supplier names.

In order to calculate a risk score for an application, the risk assessment engine 114 may be configured to expose the components of that application (e.g., as determined from the SBOM data 116). In some cases, information for all of the components involved in the application and how those components are used may be included in the SBOM data for that application. In some cases, each time that a component is determined by the risk assessment engine 114 to be associated with the application, SBOM data may be recursively retrieved for that component and exposed. The risk assessment engine 114 may then calculate a risk score for the application based on individual CVE scores for each of the components associated with that application.

In some embodiments, the risk assessment engine 114 may be configured to identify a number of updates that are application to the application (e.g., as applicable to a component associated with the application). the risk assessment engine 114 may calculate a change in the determined risk score that can be achieved by applying one or more of the updates.

In some embodiments, the application provider 110 may be any computing device capable of hosting one or more software applications. In some embodiments, the application provider 110 may include one or more Software as a Service (SaaS) providers hosting a number of software applications that can be accessed on demand.

It should be noted that the core network 106 may be in communication with the application provider 110 via any suitable connection. For example, the core network 106 may be in communication with the application provider 110 via a connection over the Internet. In another example, the core network 106 may be in communication with the application provider 110 via a network tunnel created over a software-defined wide area network. SD-WANs represent the application of SDN principles to WAN connections, such as connections using cellular networks, the Internet, and Multiprotocol Label Switching (MPLS) networks.

The various embodiments further can be implemented in a wide variety of operating environments, which in some cases can include one or more user computers, computing devices or processing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

In embodiments in which the core network 106 uses a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java™, C, C# or C++, or any scripting language, such as Perl, Python or TCL, as well as combinations thereof. The server(s) may also include database servers, including without limitation those commercially available from Oracle™, Microsoft™, Sybase™, and IBM™.

Regardless of the specific connectivity configuration for a network implemented in the example environment, a variety of access technologies may be used (e.g., ADSL, 4G, 5G, etc.) in all cases, as well as various networking technologies (e.g., public Internet, MPLS (with or without strict SLA), etc.) to connect the LAN 102 to application provider 110. Other deployments scenarios are also possible, such as using Colo, accessing application provider 110 via Zscaler™ or Umbrella™ services, and the like.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
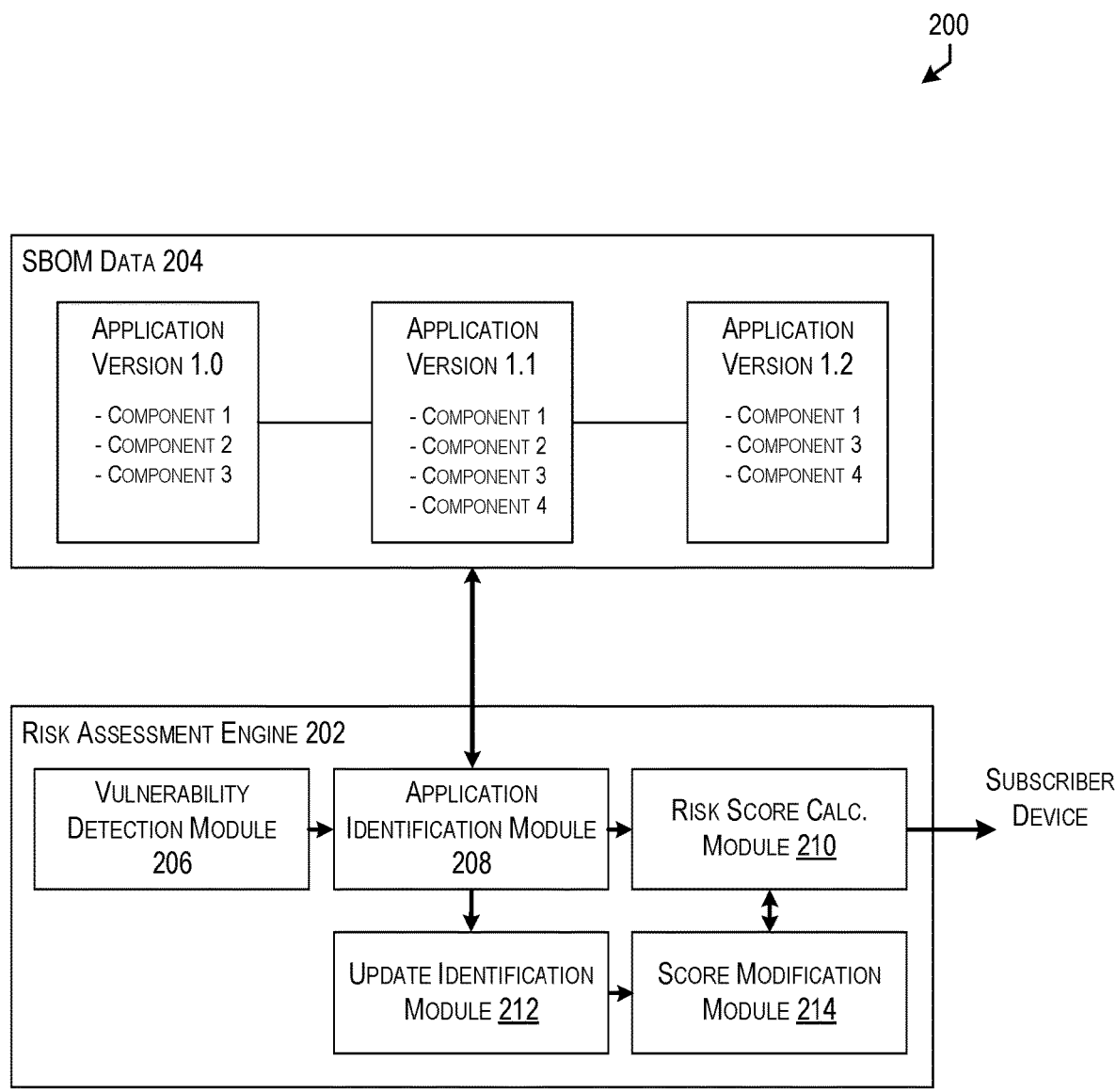
FIG. 2 depicts a block diagram illustrating an example of a risk assessment engine that may be implemented to determine a level of risk associated with a software application in accordance with at least some embodiments.

FIG. 2 depicts a block diagram illustrating an example of a risk assessment engine 200 that may be implemented to determine a level of risk associated with a software application in accordance with at least some embodiments. As noted elsewhere, a risk assessment engine 202 may be implemented within an access control device. It should be noted that the risk assessment engine 202 may be an example of the risk assessment engine 112 as depicted in FIG. 1.

As noted elsewhere, the system may include SBOM data 204 that includes a record of what software components are included in a software application. In some embodiments, the SBOM data 204 may be stored locally in a memory of a network device (e.g., a device implemented within core network 106 as depicted in FIG. 1). In other embodiments, the SBOM data may be received from an application provider (e.g., application provider 110 as depicted in FIG. 1) that hosts one or more software applications.

In some cases, the SBOM data 204 may include an indication of various components that are included in a particular version of the software. In embodiments, the SBOM data 204 may include an immutable record. For example, the SBOM data 204 may be implemented as a blockchain ledger (e.g., Supply Chain Integrity, Transparency, and Trust (SCITT)) or an append-only database. It should be noted that the use of an immutable record in the system may prevent providers of software applications from hiding or otherwise misrepresenting a dependence of a software application on particular components that may be later discovered to be vulnerable to a threat. In some embodiments, the SBOM data may be arranged in a tree structure, indicating multiple layers of relationships between the various components. In some cases, the SBOM data may include an indication of a reference to a component that might be another software application for which additional SBOM data may be maintained.

In some cases, the SBOM data 204 may differentiate the record of components (e.g., artifacts) in a software application by version (e.g., software release version). By way of illustration, while each version of a software application may utilize a common set of components (e.g., libraries, open-source packages, repositories, etc.), the particular combination of components associated with the software application may be different for each version. By way of illustration, FIG. 2 depicts an exemplary SBOM data 204 for a software application. In this example, the SBOM data may include information about a first set of components 1-3 associated with version 1.0 of the software application, a second set of components 1-4 associated with version 1.1 of the software application, and a third set of components 1, 3, and 4 associated with version 1.2 of the software application.

In embodiments, the risk assessment engine 202 may include a number of modules configured to perform the functionality as described herein (e.g., assess a risk score associated with a software application). For example, the risk assessment engine 202 may include a vulnerability detection module 206, an application identification module 208, a risk score calculation module 210, an update identification module 212, and/or a score modification module 214. Additionally, the risk assessment engine 202 may have access to one or more data repositories.

A vulnerability detection module 206, as described herein, may be configured to identify and detect new threats (i.e., vulnerabilities) that may impact software applications. In some embodiments, this may involve receiving an indication of a threat from a third-party vulnerability management platform, such as KENNA® or CYBERVISION®. In embodiments, the indication of the threat may include information about what software components are impacted by the threat as well as what potential impact the threat might have on the component. Accordingly, the vulnerability detection module 206 may be configured to identify, for each detected threat, components that may be at risk in relation to that threat. In some cases, when a new threat is detected, a CVE score associated with a component may be updated to reflect a vulnerability to that threat.

An application identification module 208 may be configured to identify a software application and corresponding version to be assessed. Upon identifying a software application and version, the application identification module 208 may be configured to retrieve SBOM data associated with the appropriate application and version. In various embodiments, the application identification module 208 is configured to identify one or more components that is determined to be vulnerable to a newly detected threat. Based on such a determination, the application identification module 208 may be configured to modify or update a CVE score retrieved in relation to each component based on its vulnerability.

Once information about a number of components associated with an application has been determined, the risk assessment module 210 may be configured to calculate a risk score for that application. In some cases, this may involve calculating a risk score as a function of the CVE scores of the components that make up the software application. In embodiments, the risk score might be a numeric representation of the likelihood that the software application could be exploited by an attacker based on its reliance upon one or more vulnerable component. In some embodiments, the risk score calculation module 210 may provide the risk score to at least one subscriber device. A subscriber device may be any suitable electronic device authorized to access the generated risk score.

An update identification module 212 may be configured to identify a number of updates associated with a software application. Such updates may represent software updates that can be made to each of the components identified as being associated with the software application. For example, an update may be identified for a component where the current version of that component associated with (e.g., implemented within) the software application is lower than the current (e.g., latest) version. In some embodiments, the update identification module 212 may determine a difference in CVE score between the latest version of the component and the currently implemented version. For example, the latest version of the component may be less susceptible to various threats than the currently implemented version and hence, may have a lower CVE score.

A score modification module 214 may be configured to determine a difference (e.g., a reduction) in a risk score that would be achieved by implementing one or more of the identified updates. In some embodiments, this may involve executing the risk score calculation module 210 to calculate a predicted risk score for the application as implementing the identified updates and then comparing that predicted risk score against a current risk score for the application.

In some embodiments, the risk assessment engine 202 may be configured to achieve a predetermined risk score reduction. For example, the risk assessment engine 202 may be provided with a threshold risk score to be achieved in relation to a software application. In this example, the risk assessment engine 202 may be configured to identify (e.g., via the score modification module 214) a number of updates that, when implemented, would reduce the risk score for the software application so that it is under the threshold risk score. In some embodiments, the risk assessment engine 202 may be configured to identify a minimum (or maximum) achievable risk score for a software application. For example, the risk assessment engine 202 may identify the most optimal updates for every component implemented within the software application and the calculated risk score when each of those updates have been implemented.

Figure 3:
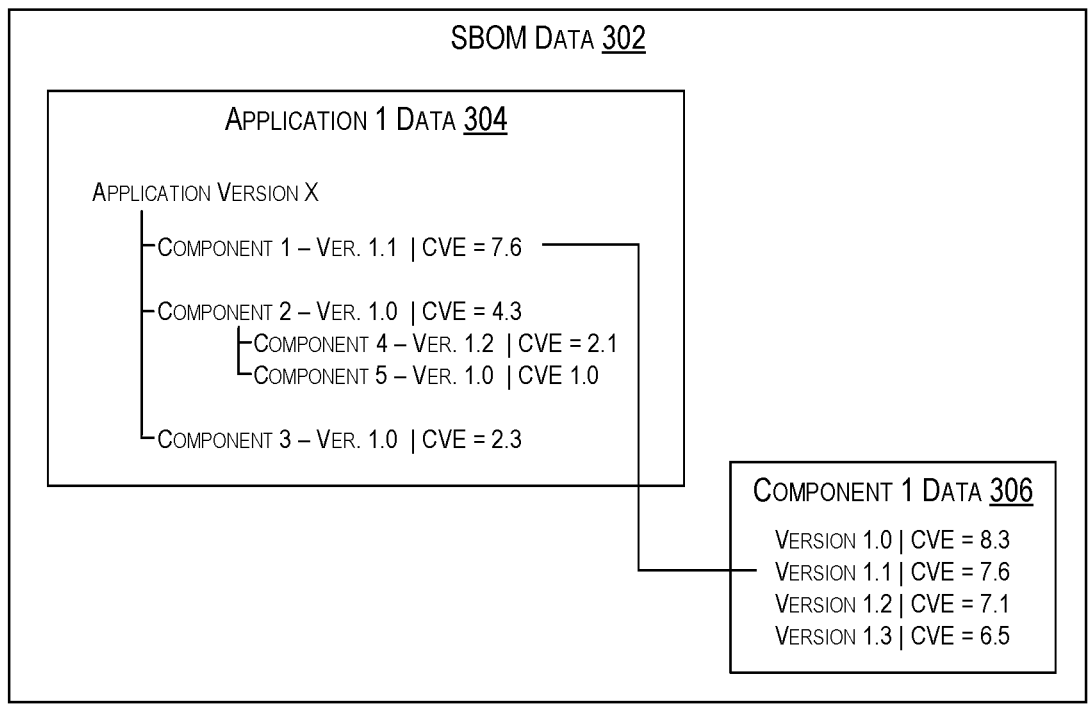
FIG. 3 depicts an example of software bill of materials (SBOM) data that may be implemented and used to generate a risk score in accordance with embodiments.

FIG. 3 depicts an example of software bill of materials (SBOM) data that may be implemented and used to generate a risk score in accordance with embodiments. As noted elsewhere, SBOM data 302 may be maintained by a software application hosting platform and may include information about each of a number of software applications that it hosts. Additionally, the SBOM data 302 may include information about individual software components (e.g., modules) that may be utilized by, or implemented within, one or more software applications. In some cases, a component may be an open source software module that may be implemented to perform some functionality within a software application. As noted elsewhere, information included in the SBOM data 302 about a software application or software component may be provided by its respective developer.

In some embodiments, the SBOM data 302 may be an example of the SBOM data 204 as described in relation to FIG. 2 above. As noted, such SBOM data 302 may include information about multiple versions of a software application. Additionally, each of the multiple versions of a software application may be associated with a different combination of components. For example, a developer of the software application may replace various components that are used by the software application across versions of that software application.

Risk scores may be generated for a software application on a version-by-version basis. In order to generate a risk score for a particular version of the software application, information about that version (e.g., Application 1 data 304) may be retrieved from SBOM data 302 and exposed to identify information about the various components used by the version of the software application. Similar to the software application itself, the SBOM data 302 may include information about each version of a component that is available for implementation. For example, given a component (e.g., Component 1), the SBOM data may maintain information about each of the versions of that component that are available (e.g., Component 1 data 306). As noted elsewhere, each version of a component may be associated with a CVE score, which may vary based on what updates/modifications have been implemented across those versions. In general, a CVE score that is calculated in accordance with the Common Vulnerability Scoring System (CVSS) may be assigned a severity along a scale of 0-10. In such CVE scores, higher values may be used to represent components with a higher degree of vulnerability. It should be noted that as new threats are discovered, CVE scores for individual components/versions may be updated based on their risk of vulnerability to those vulnerabilities.

The exposed application data 304 may include an indication of a particular version of each component that is currently implemented in the relevant version of the software application. In embodiments, a risk score for a version of the software application may be generated based on individual CVE scores for each of the components associated with the software application. Such a risk score may be generated as a function of each of the CVE scores.

In some embodiments, one or more components used by a version of a software application may rely upon other components. In such cases, when generating a risk score, the SBOM data 302 may be recursively exposed to retrieve information for each of the components associated with a software application. In addition to individual CVE scores for each of the components associated with the software application, a risk score may also take into account a number of times that each of the components is implemented within the software application. For example, an individual component may be used by multiple other components within the software application. Accordingly, a vulnerability associated with that individual component may be amplified by virtue of those multiple implementations.

In embodiments, information included in the SBOM data 302 may be used to identify one or more updates available in relation to a software application. For example, upon identifying a component associated with the software application, a number of versions of that component may each represent potential updates to be associated with the software application. In some embodiments, an update may be identified as being available for the software application if the version of the component that is implemented within a software application is not the latest, or most current, version of that component. In some embodiments, an update may be identified as being available for the software application if the version of the component that is implemented within the software application does not have the lowest CVE score available for that component (e.g., there is another version of the component having a lower CVE score).

Figure 4:
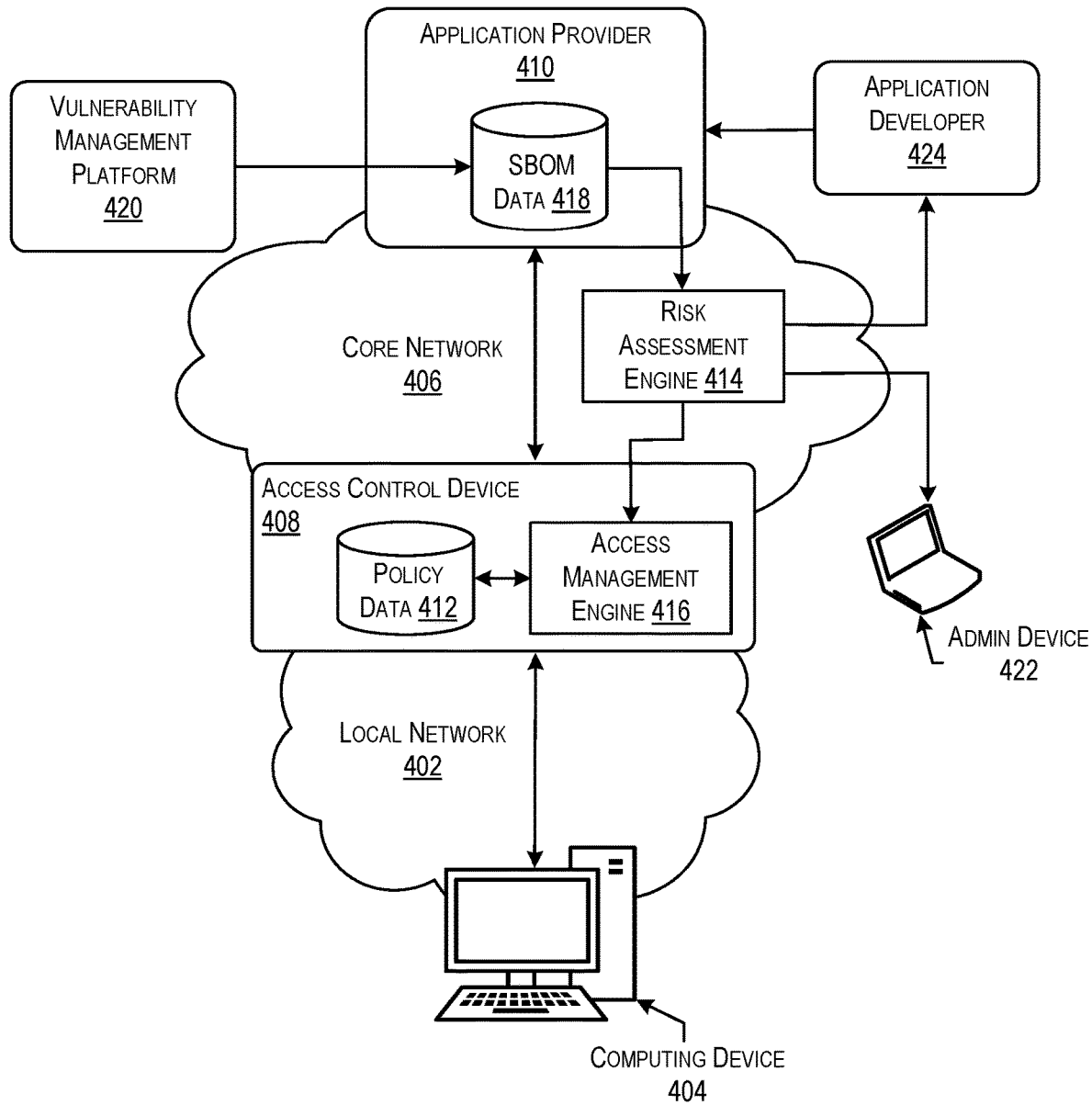
FIG. 4 depicts an example of an access control process that may be used to control access to applications hosted on an application provider based on risk score data in accordance with at least some embodiments.

FIG. 4 depicts an example of an access control process that may be used to control access to applications hosted on an application provider based on risk score data in accordance with at least some embodiments. As depicted, an organization may maintain a local network 402 which provides connectivity between a number of computing devices 404 within the organization. The local network 402 may be in communication with a core network 406 via an access control device 408. In embodiments, the access control device 408 is implemented on an electronic device that provides ingress/egress between the local network 402 and the core network 406, such as a router or other edge device.

As noted elsewhere, the local network 402 may be maintained in relation to an organization, such as a business or other group. The local network 402 may include a number of computing devices 404 that are associated with that organization. In embodiments, a user of a computing device 404 may submit a request to access an application hosted by an application provider 410. For example, a user of the computing device 404 may request access to a Software as a Service (SaaS) application that is hosted on a remote server accessible over the core network 406.

When implemented, the access control device 408 is configured to route communications between the computing devices 408 on the local network 402 and applications hosted by the application provider 410 over the network 406. Upon receiving the request to access the application, the access control device 408 may make a determination as to whether to allow the request to be forwarded to the application provider 410. In embodiments, this may involve determining whether a risk score associated with the request is in compliance with policy data 412 associated with the organization. In embodiments, the policy data 412 may be provisioned onto the access control device 408 by an administrator or other user associated with the organization that manages operations related to the local network 402.

In embodiments, the policy data 412 may include an indication of a level of risk that is suitable to take on with respect to requests originating from the organization. In some cases, the policy data 412 may include an indication of a type of risk that the organization is willing to take on (e.g., potential exposure to software viruses, potential exposure to man-in-the-middle attack, etc.). In some embodiments, the policy data 412 may include an indication of a maximum/minimum risk score to be associated with requests to access applications. In these embodiments, the indicated risk score may be represented as a numeric value to be compared against the maximum/minimum risk score in order to determine if the request to access the application should be granted. In some embodiments, the level of risk that is suitable with respect to requests to access an application may vary based on a role associated with a user of the computing device 404 from which the request originated. For example, certain users may be permitted riskier access than others based on their role or credentials.

Upon, or prior to, receiving a request to access an application hosted by an application provider 410, a risk score may be calculated for the software application associated with the request by a risk assessment engine 414 (e.g., an example of risk assessment engine 202 as described in relation to FIG. 2 above). The risk score that is generated by the risk assessment engine 414 may be received by an access management engine 416 that is configured to make access control decisions. Upon receiving a request to access a software application to be accessed by the computing device 404, an access management engine 416 may be configured to compare a risk score received in relation to that software application against a maximum risk score threshold indicated in the policy data 412 as being associated with the computing device 404 from which the request originated. In such cases, if the risk score associated with the software application is greater than a risk score threshold indicated in the policy data 412, the access management engine 416 may deny the request to access the software application that is being requested. Alternatively, if the risk score associated with the software application is less than or equal to a risk score threshold indicated in the policy data 412, the access management engine 416 may allow the request to access the software application that is being requested.

As noted elsewhere, an application provider 410 (e.g., an application hosting platform) may maintain SBOM data 418 that includes information related to a number of different software applications as well as components used by (e.g., implemented within) such software applications. The SBOM data 418 may be an example of the SBOM data 302 as described in relation to FIG. 3 above. In some embodiments, the application provider 410 may update (e.g., periodically or continuously) SBOM data 418 as information is received about threat data. For example, the application provider 410 may receive an indication of a threat from a third-party vulnerability management platform 420, such as KENNA® or CYBERVISION®. In embodiments, the indication of the threat may include information about what software components are impacted by the threat as well as what potential impact the threat might have on the component. Upon receiving information about such a threat, the SBOM data 418 may be updated to reflect the vulnerabilities identified. As noted elsewhere, while the SBOM data 418 may be updated by the application provider 410, such updates may be made by a risk assessment engine 414 as implemented within a core network 406 instead.

In some embodiments, a risk assessment engine 414 may be implemented within, or in communication with, a core network 406. As described elsewhere, the risk assessment engine 414 may be configured to generate a risk score for a software application based on vulnerability information associated with each of the components used by that software application. In embodiments, such a risk score is generated as a function of the individual CVE scores of its components. For example, the risk score may be generated by summing up each of the CVE scores of each of the individual components included in the software application. A risk assessment engine may be configured to update (e.g., recalculate) a risk score for a software application periodically or when access to the software application is requested. In embodiments, risk scores generated by the risk assessment engine 414 may be distributed to a number of access control devices 408.

In some embodiments, a risk assessment engine 414 may be further configured to predict risk score associated with implementation of one or more updates for the software application. In some cases, such a prediction may be used to identify one or more updates that can be applied to reduce a current risk score associated with the software application so that it is below a threshold risk score value. To do this, the risk assessment engine 414 may be configured to identify a number of updates that could potentially be made to various components used by the software application. For example, the risk assessment engine 414 may be configured to identify a number of different versions of one or more of those components. In this example, an update may be identified where a current version of the component as implemented within the software application is not the latest version or if a CVE score associated with the current version of the component as implemented within the software application is not the best available for that component. Upon identifying a number of updates available to a software application, the risk assessment engine 414 may be configured to generate a predicted risk score that would result from implementation of a combination of the identified updates.

In some cases, information about risk scores generated by a risk assessment engine 414 (e.g., current or predicted) can be provided to at least one second computing device, such as an admin device 422. In some cases, a user operating such an admin device 422 may select a proposed update to be implemented. In order to implement such an update, instructions may be provided by the risk assessment engine 414 to the application provider 410 in order to cause it to generate a new version of the software application that has implemented the proposed updates. In some cases, where a software application is developed/maintained by an application developer 424, the risk assessment engine 414 (or some other component associated with the core network 106 or application provider 410) may provide a request to that application developer 424 to implement the requested updates to the software application.

Figure 5:
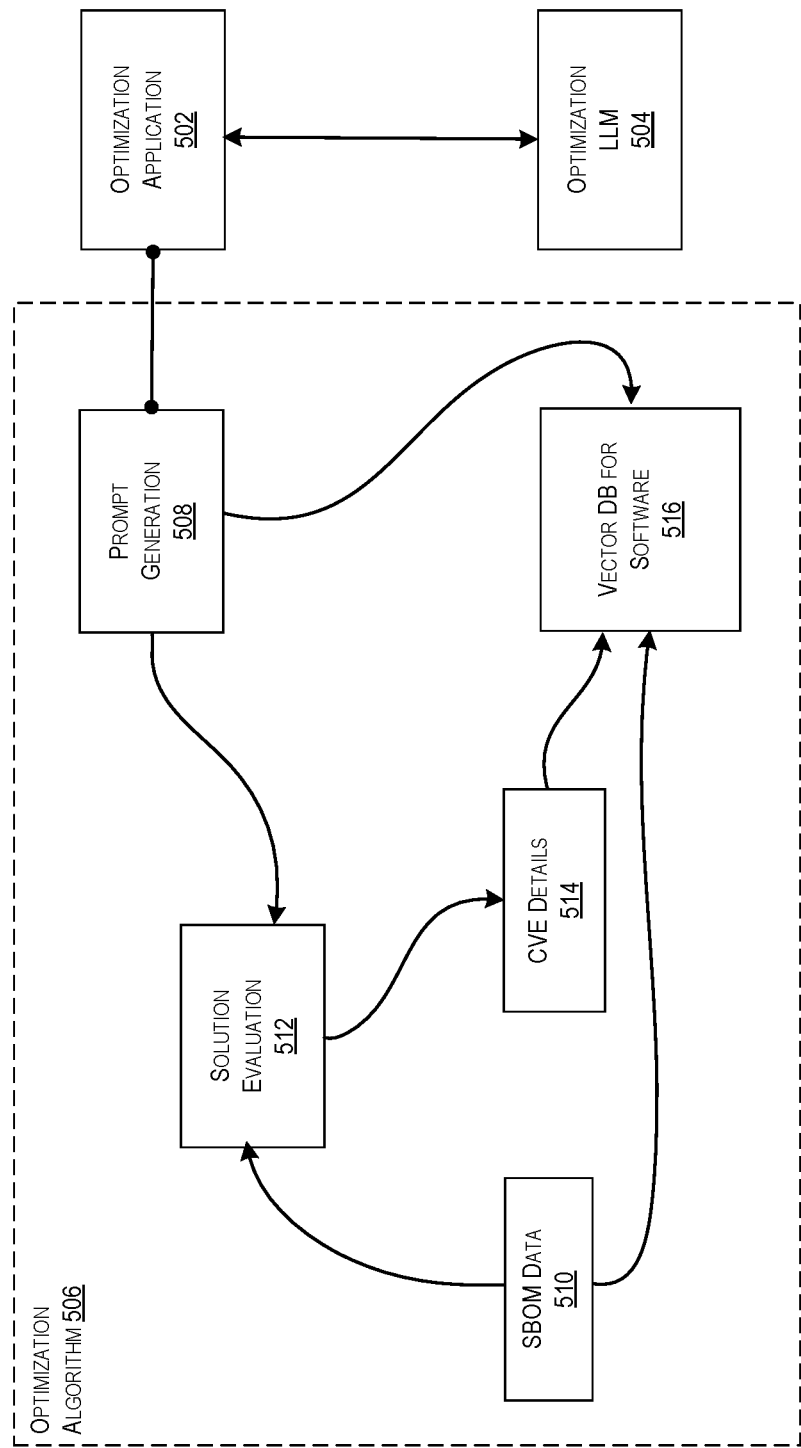
FIG. 5 depicts a flow chart illustrating an exemplary process for optimizing risk reduction in accordance with at least some embodiments.

FIG. 5 depicts a flow chart illustrating an exemplary process for optimizing risk reduction in accordance with at least some embodiments. Particularly, the process 500 depicts optimization of risk reduction through identification of a component or components that should be replaced/updated to have the greatest impact on a risk score for a software application, to achieve the greatest reduction in risk associated with the software application while applying the fewest number of updates.

In some embodiments, optimization of risk reduction as described herein may be implemented through interactions between an optimization application 502 and one or more large language models (LLMs), such as an optimization LLM 504. LLMs are usually very large deep learning models potentially containing hundreds of billions of parameters and trained on tens of terabytes of text. In such embodiments, an Optimization LLM 504 may use a structured, machine-readable representation of data that conforms to a machine-readable language, such as a universal language, to identify an order of updates/fixes to be applied to a software application in order to achieve a desired reduction in risk score for that software application.

During operation, an optimization application may perform an optimization algorithm 506 as depicted in FIG. 5. In performance of such an algorithm, a number of prompts may be generated (e.g., via prompt generation 508) and resolved. In some cases, an optimization LLM 504 may be configured to accept input in the form of a prompt template, which may include text data and/or a set on of input data for a prompt or series of prompts. In such cases, the LLM is configured to respond to each prompt while maintaining contextual continuity (historical context related to previous prompts). In some cases, one or more datasets can be provided to an LLM using a prompt template. For example, SBOM data may be provided to an LLM as input.

Initially, a user may provide SBOM data 510 to the optimization LLM 504 along with a request to identify available updates that result in the greatest impact to a risk score reduction for a software application. In some cases, such a prompt may be accompanied by text data directing the prompt. By way of example, exemplary text data may be "Given the following SBOMs, which CVE fixes provide the optimal risk reduction?"

In response to such a prompt, the optimization LLM 504 may be configured to identify each of the various components associated with the software application in order to generate a solution evaluation 512. The optimization LLM 504 may then determine corresponding CVEs for each of the components based on the provided SBOM data.

A follow-up prompt may be provided to the optimization LLM 504 to cause it to identify CVEs that have an outsized negative impact on a risk score associated with the software application. For example, the optimization LLM 504 may be configured to identify each of the components for a software application that have a CVE that is above (or alternatively below) a predetermined threshold value (e.g., above CVSS 3.0). In some cases, the optimization LLM 504 may be configured to identify components having the highest CVE. As noted elsewhere, the follow-up prompt may be accompanied by text input intended to direct the optimization LLM 504. By way of example, exemplary text data may be "Optimize by identifying CVEs that are above CVSS 3.0 and report back the CVEs to be fixed." Note that the optimization LLM 504 maintains contextual continuity and will treat the follow-up prompt based on the context established via the initial prompt. CVE details 514 may be generated by the optimization LLM 504 based on such a prompt.

In embodiments, the CVE details 514 may include information about one or more updates related to the components of the software application. The CVE details may include information about a difference in CVE values between different versions of the component. For example, the CVE details may include information about a difference between a CVE value for a first version of the component and a CVE value for a second (e.g., updated) version of the component.

The optimization LLM 504 may generate a vector database for the software at 516. Such a vector database may include information about an impact that each update for a CVE has on the software. Particularly, the vector database may maintain information about differences in CVEs associated with versions of each component as multiplied by a number of times that the respective components are implemented in the software application.

A prompt may then be provided to cause the optimization LLM 504 to present a total impact that each of the respective updates will have on the risk score for the software application. In embodiments, a "vector" of the vector database may describe a total impact of an update that can be applied to a component on the risk score for the software application. In such a vector database, updates to the various components can be sorted according to their respective impact on the risk score for the software application. By way of example, exemplary text associated with such a prompt may include "Along with total CVSS reduction percentage."

In some cases, a prompt may be provided to cause the optimization application 502 to present a visual representation of the information generated by the optimization LLM 504. For example, a prompt may include text such as "Provide a graph showing the fixes suggested and the cumulative risk reduction (defined as) 'RScore'." In such cases, the optimization application 502 may be configured to generate a graph, such as the graph presented in FIG. 6, depicting an impact that implementation of one or more updates is determined to have on the risk score for the software application.

In embodiments, the optimization LLM 504 may be "tuned" based on the ingested data (e.g., the SBOM data as well as user feedback). The optimization LLM 504 may utilize a supervised or unsupervised model. The ingested data may be used to train the optimization LLM 504 by correcting incorrect assumptions/outputs.

In some embodiments, the optimization application 502 may be configured to generate a certificate associated with a risk score determined for the software application. For example, the optimization application 502 may be configured to generate a X.509 SSL certificate based on the RScore value determined by the optimization LLM 504.

Figure 6:
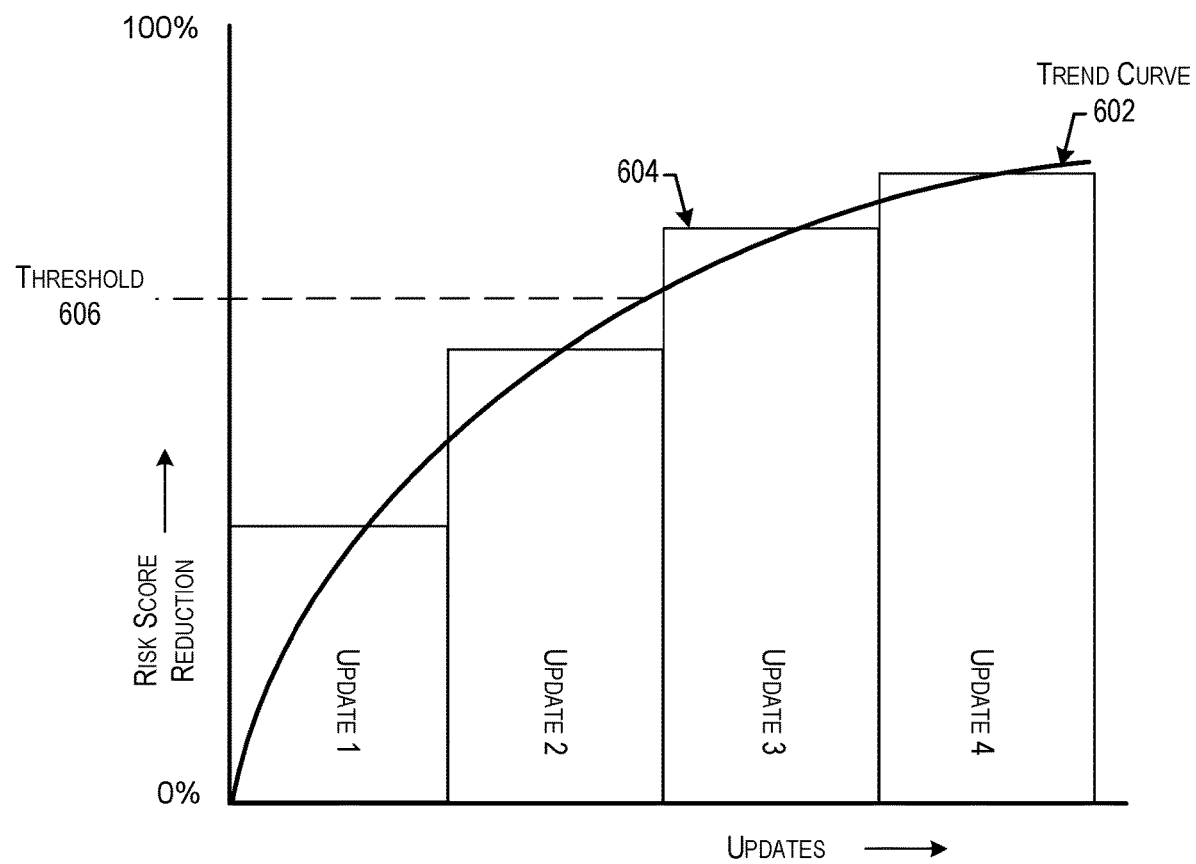
FIG. 6 depicts a graph that illustrates an example relationship between updates and risk score reductions in accordance with some embodiments.

FIG. 6 depicts a graph that illustrates an example relationship between updates and risk score reductions in accordance with some embodiments. As noted elsewhere, the system as described herein may be configured to identify a number of updates that can be applied to a software application in order to achieve a specified reduction to a current risk score for that software application.

In some embodiments, the updates identified as being available for a software application may be prioritized based on the amount of impact that each respective update would have on the risk score for the software application when implemented. For example, a difference in CVE score may be identified for each of the respective updates to a component. That different may be multiplied by the number of times that the component is implemented within the software application to determine an impact of the update on the software application.

In the depicted graph, the horizontal axis represents updates (e.g., fixes, patches, version updates, etc.) that can be implemented for a software application. More particularly, the updates relate to components that make up, or are otherwise associated with, the software application. The vertical axis represents a corresponding reduction in the risk score associated with the software application. In the graph, blocks represented by individual updates are representative of the risk score reduction related to that update as well as the risk score reduction for each of the updates that are implemented before it. For example, the implementation of Update 3 may correspond to a risk score reduction value 604 that represents the risk score reduction attributed to the implementation of Update 3 as well as the implementation of Update 2 and Update 1, which should be implemented prior to, or at the same time as, Update 3.

Note that each individual update that is implemented would give a set amount of risk score reduction, which, when combined with the risk score reduction of the updates applied before it, results in a step function. However, one skilled in the art would recognize that as the number of updates available for the software application is increased, the graph would become more granular and may generally conform to a trend curve 602 that can be expressed as being roughly representative of the relationship between the implementation of updates to the software application and the corresponding risk score reduction for that software application.

In embodiments, the available updates for the software application may be ordered based on impact, such that the updates having the highest impact (e.g., biggest reduction in risk score) for the software application would be implemented first (e.g., given the highest implementation priority). This allows for the greatest amount of risk reduction to be performed with minimum effort and delay. When ordered based on impact, continued implementation of updates would have diminishing returns on risk score reduction. For example, a trend curve 602 as illustrated in graph of FIG. 6 representative of the risk reduction related to continued implementation of updates would conform to a non-decreasing concave function. It should be noted that there may be some maximum amount of risk score reduction that is available to a software application. This is partly because the risk score for a software application is unlikely to ever reach zero (since no software application is completely invulnerable to threats) and partly because there are always a finite number of updates for any given software application. Hence, a trend curve 602 representing risk score reduction for a software application may approach some limit that represents a maximum amount of risk score reduction.

In some cases, the system as described herein may be provided with an indication of a threshold 606 that represents a risk score reduction that one would like to achieve in relation to the software application. In such cases, the system may be configured to identify one or more updates that, when implemented, are predicted to result in a risk reduction that meets or exceeds that threshold. For example, based on the depicted graph, the system may determine that each of Updates 1, 2, and 3 should be implemented to achieve the threshold 606. This is illustrated by the depiction that the risk score reduction value 604 associated with Update 3 is greater than the threshold 606 whereas the risk score reduction value associated with Update 2 is less than the threshold 606 (and hence is insufficient). Based on this, the system may, when provided the threshold 606, provide instructions (or a recommendation) to implement Updates 1, 2, and 3.

Figure 7:
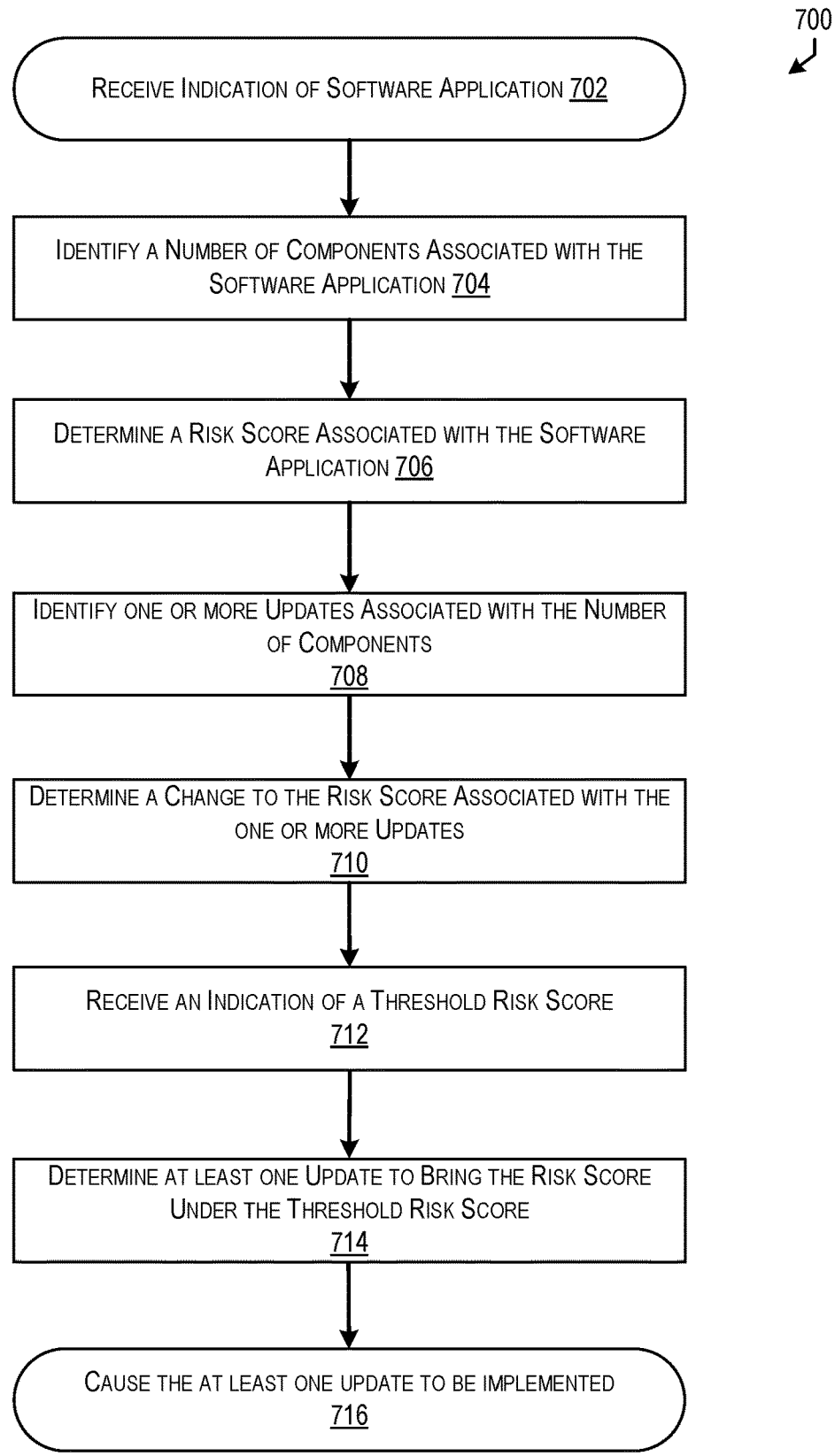
FIG. 7 depicts a block diagram illustrating an example of a process for generating a risk score associated with a software application in accordance with at least some embodiments.

FIG. 7 depicts a block diagram illustrating an example of a process for generating a risk score associated with a software application in accordance with at least some embodiments. The process 700 may be performed by a risk assessment engine implemented on computing device operating on a network, such as the risk assessment engine 114 as described in relation to FIG. 1 above. As noted elsewhere, the computing device may be a server computing device operating on the network.

At 702, the process 700 involves receiving an indication of a software application for which a risk score is to be generated. In some embodiments, the indication of the software application is received via a request by a client computing device to access that software application on an application provider. In some embodiments, the indication of the software application is received from a user device as input by a user that wishes to access a risk score for that software application.

At 704, the process 700 involves identifying a number of components associated with the software application. In embodiments, the number of components associated with the software application are identified via a software bill of materials (SBOM) associated with the software application. In some cases, the SBOM is maintained by an application provider that is hosting the software application. The SBOM may further include information about a number of vulnerability scores associated with the each of the components determined to be associated with the software application.

At 706, the process 700 involves determining a risk score associated with the software application based on the number of components. In embodiments, the risk score is calculated as a function of the number of vulnerability scores corresponding to the number of components. Additionally, the risk score may be further calculated based on a number of times each component of the number of components is instantiated. By way of example, the risk score may be calculated as a sum of each of the CVE scores for the respective components as multiplied by the number of times that the respective component is implemented in relation to the software application.

At 708, the process 700 involves identifying one or more updates (e.g., a set of updates) associated with the number of components. In embodiments, each of the one or more updates associated with the number of components includes a patch or version update for a component used by the software application.

At 710, the process 700 involves determining a change to the risk score associated with implementation of the one or more updates. In embodiments, change to the risk score that is attributed to an update may be calculated as a function of a difference in a vulnerability score for a component associated with the update that results from the update. Additionally, the change to the risk score attributed to an update may be further calculated as a function of the number of times that the component is implemented in the software application.

At 712, the process 700 may involve receiving an indication of a threshold risk score value. In some embodiments, a threshold risk score value is received from a user (e.g., via a client user device) in order to ascertain one or more updates to be implemented. In some embodiments, the threshold risk score value is associated with an organization. For example, the threshold risk score value may be obtained from policy data stored in association with an organization.

At 714, the process 700 involves determining at least one update of the one or more updates that, when implemented, is calculated to result in a reduction of the risk score below the threshold risk score value. In embodiments, the one or more updates are ordered based on an amount of the change to the risk score attributed to a respective update of the one or more updates.

At 716, the process 700 involves causing the at least one update to be implemented. In some embodiments, causing at least one update to be implemented comprises providing instructions to an application provider to implement the at least one update with respect to the software application. In some embodiments, causing at least one update to be implemented comprises providing instructions to a developer associated with the software application. In embodiments in which the threshold risk score value is associated with an organization, the process 700 may further involve providing information about the at least one update to an entity associated with the organization. For example, such information may be provided to an administrator or other user associated with the organization via contact information stored in relation to the organization.

Figure 8:
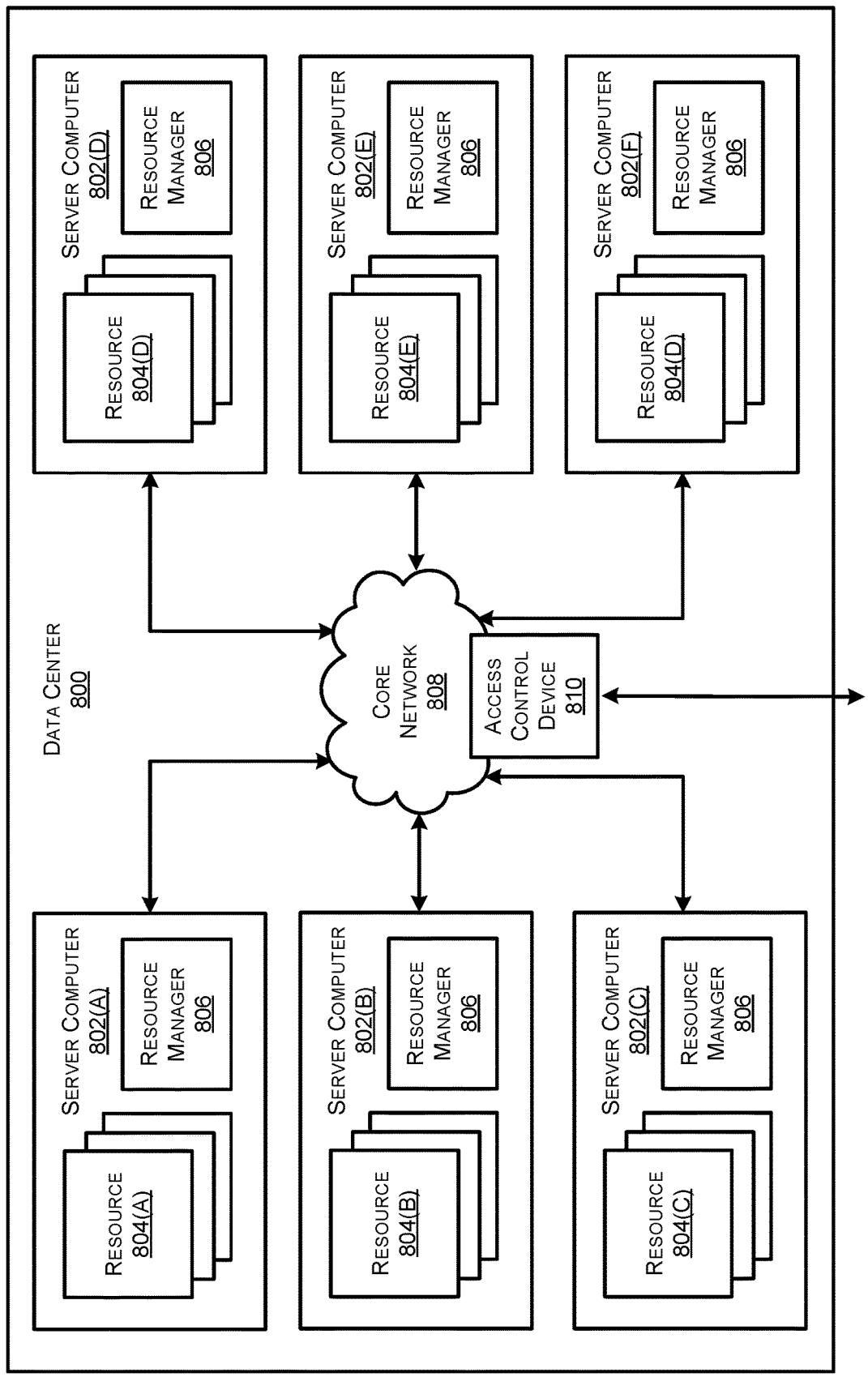
FIG. 8 is a computing system diagram illustrating a configuration for a data center 700 that can be utilized to implement aspects of the technologies disclosed herein.

FIG. 8 is a computing system diagram illustrating a configuration for a data center 800 that can be utilized to implement aspects of the technologies disclosed herein. The example data center 800 shown in FIG. 8 includes several server computers 802A-802F (which might be referred to herein singularly as "a server computer 802" or in the plural as "the server computers 802") for providing computing resources. In some examples, the resources and/or server computers 802 may include, or correspond to, the any type of networked device described herein. Although described as servers, the server computers 802 may comprise any type of networked device, such as servers, switches, routers, hubs, bridges, gateways, modems, repeaters, access points, etc.

The server computers 802 can be standard tower, rack-mount, or blade server computers configured appropriately for providing computing resources. In some examples, the server computers 802 may provide computing resources 804 including data processing resources such as virtual machine (VM) instances or hardware computing systems, database clusters, computing clusters, storage clusters, data storage resources, database resources, networking resources, and others. Some of the server computers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 800 can also be configured to provide network services and other types of services.

In the example data center 800 shown in FIG. 8, an appropriate network (e.g., core network 808) is also utilized to interconnect the server computers 802A-802F. In some cases, the core network 808 may be an example of the core network 106 as described in relation to FIG. 1 above. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the server computers 802A-802F in each data center 800, and, potentially, between computing resources in each of the server computers 802. It should be appreciated that the configuration of the data center 800 described with reference to FIG. 8 is merely illustrative and that other implementations can be utilized.

In some embodiments, the core network 808 may comprise a software defined-wide area network (SD-WAN). In such a network, a SD-WAN fabric may be implemented across a number of computing devices each acting as nodes in the SD-WAN fabric. The computing devices making up the SD-WAN fabric may be centralized or clustered in a single location (e.g., data center 800) or may be geographically distributed throughout one or more regions. Overseeing the operations of the SD-WAN fabric may be an SDN controller. In general, an SDN controller may comprise one or more devices configured to provide a supervisory service, typically hosted in the cloud, to the SD-WAN fabric and/or one or more SD-WAN service points. For instance, an SDN controller may be responsible for monitoring the operations thereof, promulgating policies (e.g., security policies, etc.), installing or adjusting IPsec routes/tunnels between a local area network (LAN) and remote destinations such as an application provider 110.

Ingress/Egress between the network 808 and another network (e.g., a LAN) may be managed by an access control device 810. Such an access control device 810 may include a router or other device configured to perform routing and/or switching operations from network traffic flowing in and out of the network 808.

In some examples, the server computers 902 may each execute one or more application containers and/or virtual machines to perform techniques described herein. For example, one or more of the components attributed to a core network (e.g., core network 106 as described in relation to FIG. 1) may be implemented on, or hosted by, one or more of the server computers 902. For example, a risk assessment engine (e.g., risk assessment engine 114 as described in relation to FIG. 1) may be implemented on a server computer 802.

In some instances, the data center 800 may provide computing resources, like application containers, VM instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like application containers and VM instances, data storage resources, networking resources, data communication resources, network services, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one embodiment by one or more data centers 800 (which might be referred to herein singularly as "a data center 800" or in the plural as "the data centers 800"). The data centers 800 are facilities utilized to house and operate computer systems and associated components. The data centers 800 typically include redundant and backup power, communications, cooling, and security systems. The data centers 800 can also be located in geographically disparate locations. One illustrative embodiment for a data center 800 that can be utilized to implement the technologies disclosed herein will be described below with regard to FIG. 9.

Figure 9:
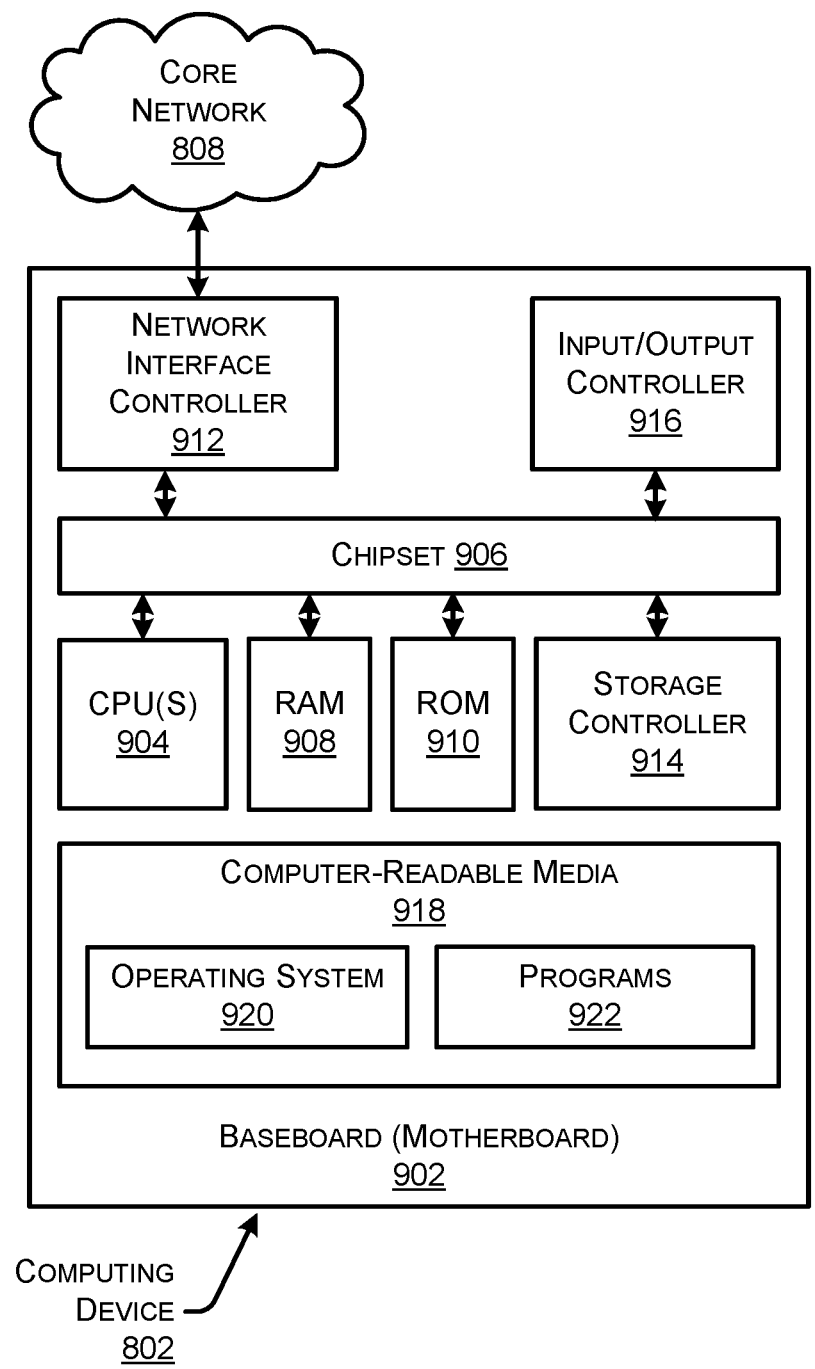
FIG. 9 shows an example computer architecture for a server computer 902 capable of executing program components for implementing the functionality described above.

FIG. 9 shows an example computer architecture for a server computer 802 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. The server computer 802 may, in some examples, correspond to a physical server as described herein, and may comprise networked devices such as servers, switches, routers, hubs, bridges, gateways, modems, repeaters, access points, etc.

The computer 802 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the server computer 802.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the server computer 802. The chipset 906 can further provide an interface to a computer-readable storage medium such as a read-only memory ("ROM") 910 or non-volatile RAM ("NVRAM") for storing basic routines that help to startup the server computer 802 and to transfer information between the various components and devices. The ROM 910 or NVRAM can also store other software components necessary for the operation of the server computer 802 in accordance with the configurations described herein.

The server computer 802 can operate in a networked environment using logical connections to remote computing devices and computer systems through a network, such as the network 708. The chipset 906 can include functionality for providing network connectivity through a NIC 912, such as a gigabit Ethernet adapter. The NIC 912 is capable of connecting the server computer 802 to other computing devices over the network 708. It should be appreciated that multiple NICs 912 can be present in the server computer 802, connecting the computer to other types of networks and remote computer systems.

The server computer 802 can be connected to a storage device 918 that provides non-volatile storage for the computer. The storage device 918 can store an operating system 920, programs 922, and data, which have been described in greater detail herein. The storage device 918 can be connected to the server computer 802 through a storage controller 914 connected to the chipset 906. The storage device 918 can consist of one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The server computer 802 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like.

For example, the server computer 802 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The server computer 802 can further read information from the storage device 918 by detecting the physical states or characteristics of one or more particular locations within the physical storage units.

In addition to the mass storage device 918 described above, the server computer 802 can have access to other computer-readable storage media to store and retrieve information, such as program modules, data structures, or other data. It should be appreciated by those skilled in the art that computer-readable storage media is any available media that provides for the non-transitory storage of data and that can be accessed by the server computer 802. In some examples, the operations performed by devices as described herein may be supported by one or more devices similar to the server computer 802. Stated otherwise, some or all of the operations performed by an edge device, and/or any components included therein, may be performed by one or more server computer 802 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 918 can store an operating system 920 utilized to control the operation of the server computer 802. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 918 can store other system or application programs and data utilized by the computer 802.

In one embodiment, the storage device 918 or other computer-readable storage media is encoded with computer-executable instructions which, when loaded into the computer 802, transform the computer from a general-purpose computing system into a special-purpose computer capable of implementing the embodiments described herein. These computer-executable instructions transform the computer 802 by specifying how the CPUs 904 transition between states, as described above. According to one embodiment, the computer 802 has access to computer-readable storage media storing computer-executable instructions which, when executed by the computer 802, perform the various processes described above with regard to the other figures. The computer 802 can also include computer-readable storage media having instructions stored thereupon for performing any of the other computer-implemented operations described herein.

The computer 802 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 802 might not include all of the components shown in FIG. 9, can include other components that are not explicitly shown in FIG. 9, or might utilize an architecture completely different than that shown in FIG. 9.

As described herein, the computer 802 may include one or more hardware processors (e.g., CPU 904) configured to execute one or more stored instructions. The processors may comprise one or more cores. Further, the computer 802 may include one or more network interfaces configured to provide communications between the computer 802 and other devices, such as the communications described herein as being performed by an edge device. The network interfaces may include devices configured to couple to personal area networks (PANs), wired and wireless local area networks (LANs), wired and wireless wide area networks (WANs), and so forth. More specifically, the network interfaces include the mechanical, electrical, and signaling circuitry for communicating data over physical links coupled to the network 708. The network interfaces may be configured to transmit and/or receive data using a variety of different communication protocols. Notably, a physical network interface may also be used to implement one or more virtual network interfaces, such as for virtual private network (VPN) access, known to those skilled in the art. In one example, the network interfaces may include devices compatible with Ethernet, Wi-Fi™, and so forth.

The programs 922 may comprise any type of programs or processes to perform the techniques described in this disclosure. The programs 922 may comprise any type of program that cause the computer 802 to perform techniques for communicating with other devices using any type of protocol or standard usable for determining connectivity. These software processors and/or services may comprise a risk assessment engine (e.g., risk assessment engine 114) configured to communicate with client computing devices and/or an application provider (e.g., a remote application hosting platform) in order to determine risk score information associated with various applications to be accessed on the application provider by the client computing devices.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

One or more of the programs 922 may utilize a machine learning model. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, a program 922 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that path evaluation process can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted an undesirable behavior of a path, such as its delay, packet loss, and/or jitter exceeding one or more thresholds. Conversely, the false negatives of the model may refer to the number of times the model incorrectly predicted acceptable path behavior. True negatives and positives may refer to the number of times the model correctly predicted whether the behavior of the path will be acceptable or unacceptable, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, where the core network 708 is a SD-WAN, traffic between individual sites is sent over tunnels. The tunnels are configured to use different switching fabrics, such as MPLS, Internet, 4G or 5G, etc. Often, the different switching fabrics provide different quality of service (QOS) at varied costs. For example, an MPLS fabric typically provides high QoS when compared to the Internet but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, in SD-WANs, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
    receiving an indication of a software application;
    identifying a number of components associated with the software application and a number of vulnerability scores corresponding to the number of components, wherein an individual vulnerability score of the number of vulnerability scores represents a susceptibility of an individual component of the number of components to a detected threat;
    determining a first risk score associated with the software application as a function of the number of vulnerability scores corresponding to the number of components and a number of times that each component of the number of components is implemented in the software application;

determining a maximum risk score associated with the software application;
upon determining that the first risk score is greater than the maximum risk score:
  identifying one or more updates associated with the number of components;
  determining, for individual updates of the one or more updates, an impact to be attributed to the individual update:
  selecting a subset of the one or more updates calculated to result in reduction of the first risk score to a second risk score upon implementation, an amount of the reduction corresponding to an aggregate impact associated with the subset of the one or more updates; and
upon determining that the second risk score is less than the maximum risk score, causing the subset of the one or more updates to be implemented by providing instructions to an application provider to implement the subset with respect to the software application.

2. The method of claim 1, wherein the number of components associated with the software application are identified via a software bill of materials (SBOM) associated with the software application.

3. The method of claim 1, wherein the one or more updates associated with the number of components comprises at least one of a patch or version update for a component of the number of components.

4. The method of claim 1, wherein causing the subset of the one or more updates to be implemented further comprises providing instructions to a developer associated with the software application.

5. The method of claim 1, wherein the indication of the software application is received in a request to access the software application received from a computing device.

6. The method of claim 5, wherein the maximum risk score is determined based on policy data associated with an organization to which the computing device belongs.

7. The method of claim 6, further comprising denying the request to access the software application upon determining that the first risk score is greater than the maximum risk score.

8. The method of claim 6, further comprising:
receiving a second request to access the software application from the computing device subsequent to the one or more updates having been implemented; and
upon determining that the second risk score is not greater than the maximum risk score, granting the second request to access the software application.

9. A computing device comprising:
one or more processors; and
one or more non-transitory computer-readable media storing computer-executable instructions that, when executed by the one or more processors, cause the computing device to perform operations comprising:
receiving an indication of a software application;
identifying a number of components associated with the software application and a number of vulnerability scores corresponding to the number of components, wherein an individual vulnerability score of the number of vulnerability scores represents a susceptibility of an individual component of the number of components to a detected threat;
determining a first risk score associated with the software application as a function of the number of vulnerability scores corresponding to the number of components and a number of times that each component of the number of components is implemented in the software application;
determining a threshold risk score associated with the software application;
upon determining that the first risk score is greater than the threshold risk score:
  identifying one or more updates associated with the number of components;
  determining, for individual updates of the one or more updates, an impact to be attributed to the individual update;
  selecting a subset of the one or more updates calculated to result in reduction of the first risk score to a second risk score upon implementation, an amount of the reduction corresponding to an aggregate impact associated with the subset of the one or more updates; and
upon determining that the second risk score is less than the threshold risk score, causing the subset of the one or more updates to be implemented by providing instructions to an application provider to implement the subset with respect to the software application.

10. The computing device of claim 9, wherein the application provider comprises a server computer implemented within a network.

11. The computing device of claim 10, wherein the software application is hosted by the application provider, and wherein the application provider is configured to provide one or more software services accessible over the network.

12. The computing device of claim 11, wherein the number of components associated with the software application are identified via a software bill of materials (SBOM) maintained by the application provider.

13. The computing device of claim 9, wherein the threshold risk score value is associated with an organization, and upon determining the first risk score is above the threshold risk score value, the operations further comprise:
providing information about the one or more updates to an entity associated with the organization.

14. The computing device of claim 13, wherein the threshold risk score value is obtained from policy data maintained in relation to the organization.

15. One or more non-transitory computer-readable media storing computer-executable instructions that, when executed by one or more processors, cause the one or more processors to perform operations comprising:
receiving an indication of a risk score threshold;
receiving an indication of a software application;
identifying a number of components associated with the software application and a number of vulnerability scores corresponding to the number of components, wherein an individual vulnerability score of the number of vulnerability scores represents a susceptibility of an individual component of the number of components to a detected threat; and
determining a first risk score associated with the software application as a function of the number of vulnerability scores corresponding to the number of components and a number of times that each component of the number of components is implemented in the software application;
upon determining that the risk score associated with the software application is above the risk score threshold:
  identifying a set of updates associated with the number of components;

determining, for individual updates of the set of updates, an impact to be attributed to the individual update;

selecting a subset of the set of updates to result in a change from the first risk score to a second risk score upon implementation, the subset of the set updates selected based on a calculation that the implementation will result in the second risk score being below the risk score threshold; and causing the subset of the set of updates to be implemented by providing instructions to an application provider to implement the subset with respect to the software application.

16. The one or more non-transitory computer-readable media of claim 15, wherein updates in the set of updates are ordered based on an amount of the change to the risk score attributed to a respective update of the set of updates.

* * * * *